(12) United States Patent
Hofbauer et al.

(10) Patent No.: US 9,121,344 B2
(45) Date of Patent: Sep. 1, 2015

(54) INTEGRATED PISTON AND BRIDGE

(71) Applicant: EcoMotors, Inc., Allen Park, MI (US)

(72) Inventors: Peter Hofbauer, West Bloomfield, MI (US); Steven Spurr, Brownstown, MI (US); John Michael LaFata, II, Blaine, MN (US)

(73) Assignee: EcoMotors, Inc., Allen Park, MI (US)

( * ) Notice: Subject to any disclaimer, the term of this patent is extended or adjusted under 35 U.S.C. 154(b) by 17 days.

(21) Appl. No.: 14/058,322

(22) Filed: Oct. 21, 2013

(65) Prior Publication Data

US 2014/0109877 A1    Apr. 24, 2014

Related U.S. Application Data

(60) Provisional application No. 61/717,410, filed on Oct. 23, 2012.

(51) Int. Cl.
| | |
|---|---|
| F02B 3/00 | (2006.01) |
| F02B 75/24 | (2006.01) |
| F02F 3/00 | (2006.01) |
| F16J 7/00 | (2006.01) |
| F01B 7/08 | (2006.01) |
| F02B 75/28 | (2006.01) |

(52) U.S. Cl.
CPC ............... *F02B 75/246* (2013.01); *F02F 3/003* (2013.01); *F16J 7/00* (2013.01); *F01B 7/08* (2013.01); *F02B 75/282* (2013.01); *Y10T 29/49252* (2015.01)

(58) Field of Classification Search
CPC .......... F02B 75/28; F02B 75/282; F01B 7/08; F16J 7/00; Y10T 29/49252
USPC ................................... 123/51 R, 193.4, 193.6
See application file for complete search history.

(56) References Cited

U.S. PATENT DOCUMENTS

| | | | |
|---|---|---|---|
| 1,331,695 A | 2/1920 | Carson | |
| 2,720,193 A | 10/1955 | Maybach | |
| 2,853,989 A | 9/1958 | Teegen | |
| 4,180,027 A * | 12/1979 | Taylor | 123/41.35 |
| 4,508,065 A | 4/1985 | Suchdev | |
| 4,752,995 A | 6/1988 | Collyear | |
| 4,817,505 A | 4/1989 | Rhodes | |
| 7,383,808 B1 * | 6/2008 | Azevedo et al. | 123/193.6 |
| 7,578,267 B2 | 8/2009 | Hofbauer | |
| 7,753,024 B2 | 7/2010 | Hausler | |
| 8,464,670 B2 * | 6/2013 | Hofbauer et al. | 123/51 R |
| 8,746,204 B2 * | 6/2014 | Hofbauer | 123/197.4 |

(Continued)

FOREIGN PATENT DOCUMENTS

| | | |
|---|---|---|
| EP | 439995 A1 | 5/1990 |
| KR | 1020060060105 A | 5/2006 |
| WO | 03/098003 A1 | 11/2003 |

*Primary Examiner* — Marguerite McMahon

(74) *Attorney, Agent, or Firm* — Barnes & Thornburg LLP

(57) ABSTRACT

A piston coupled to a crankshaft via pullrods presents challenges for coupling the piston to the crankshaft because the connections are provided outside the piston. A bridge is coupled to a piston skirt at the end of the piston away from the piston crown. The bridge structure includes: a central support structure, a first projection extending outwardly from the central support structure in a first radial direction, and a second projection extending outwardly from the central support structure in a second radial direction. The central support structure is substantially hollow with a series of internal braces to yield a lightweight piston.

17 Claims, 9 Drawing Sheets

(56) References Cited

U.S. PATENT DOCUMENTS

| | | | |
|---|---|---|---|
| 2005/0247274 A1* | 11/2005 | Carlson ........................ 123/46 R |
| 2009/0139476 A1 | 6/2009 | Hofbauer |
| 2010/0089358 A1 | 4/2010 | Golya |
| 2010/0147252 A1* | 6/2010 | Langner et al. ............ 123/193.6 |
| 2010/0229836 A1 | 9/2010 | Hofbauer |
| 2010/0275873 A1* | 11/2010 | Gniesmer et al. .......... 123/193.6 |
| 2012/0073538 A1 | 3/2012 | Hofbauer |
| 2014/0076264 A1* | 3/2014 | Matsuo et al. ............. 123/193.6 |

\* cited by examiner

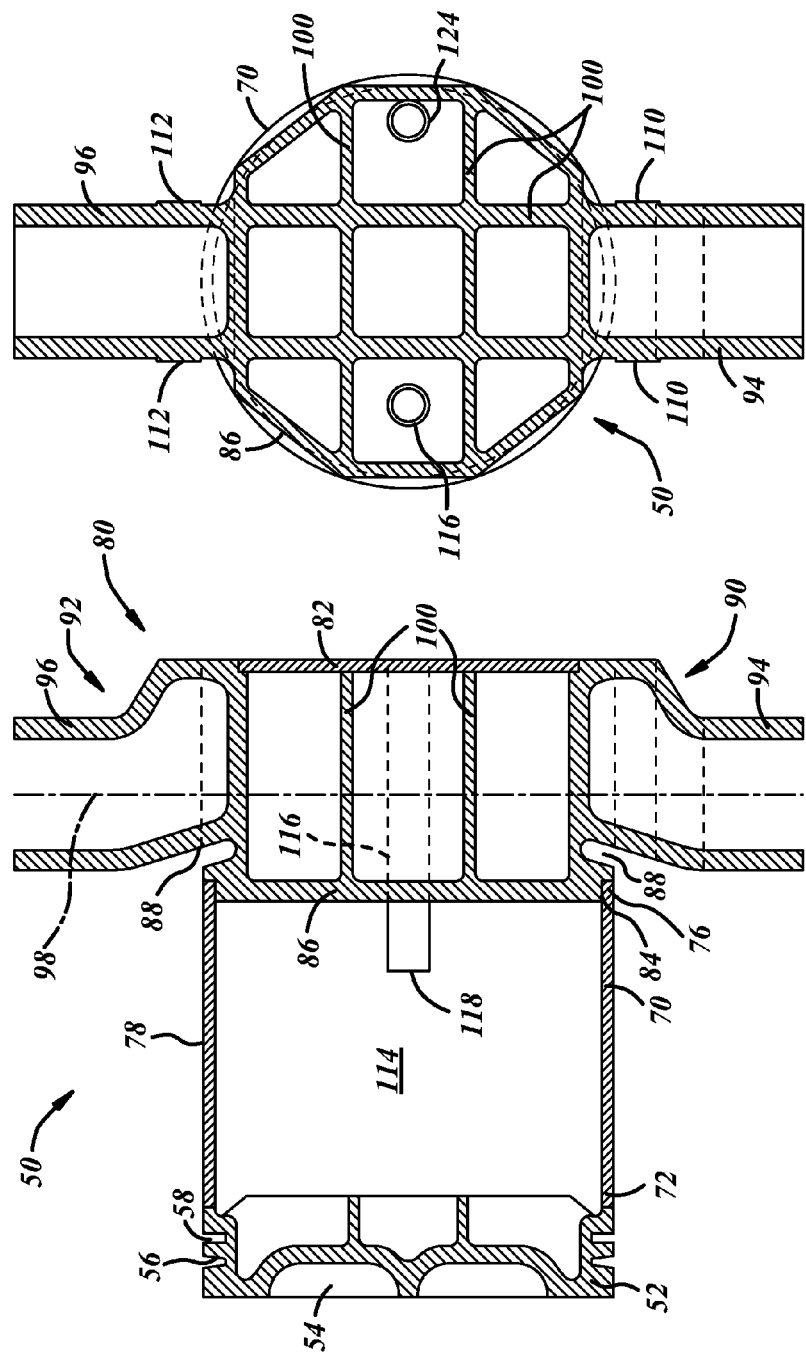

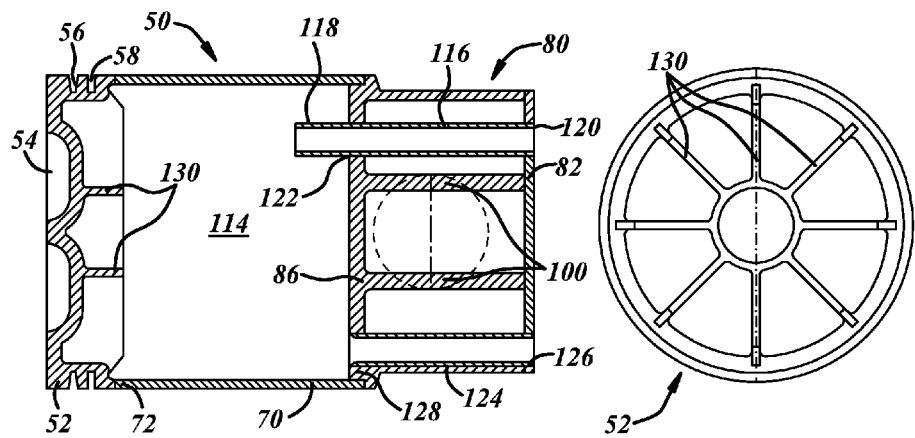
*Figure 4*  *Figure 5*
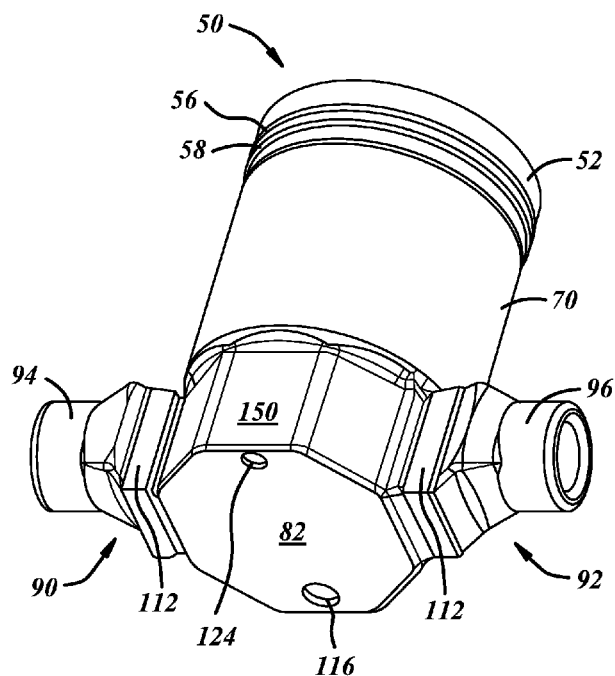
*Figure 6*

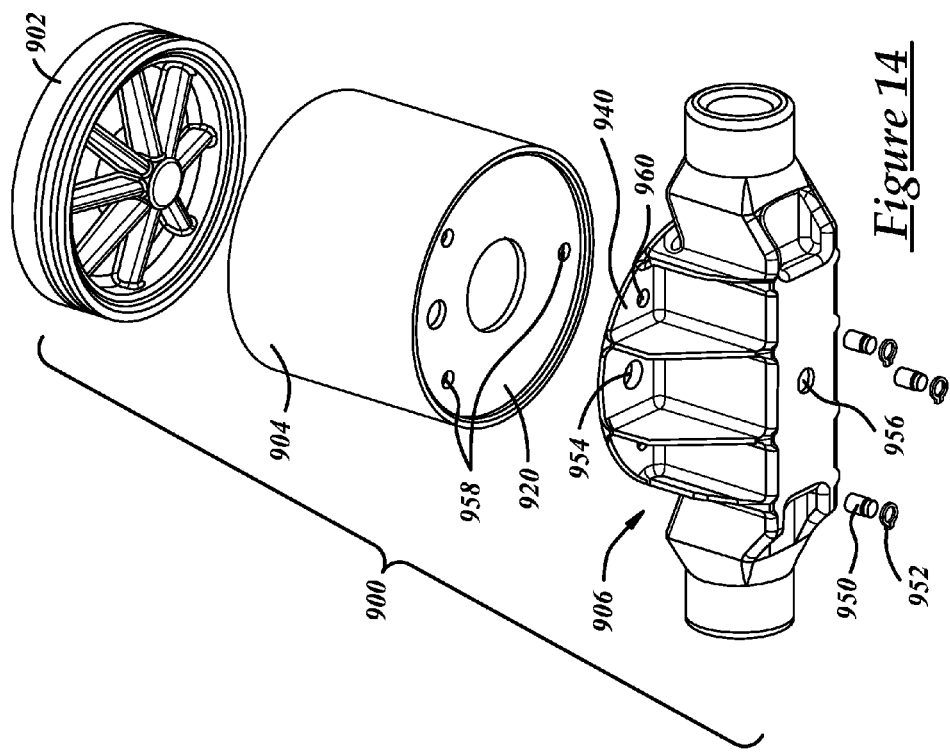
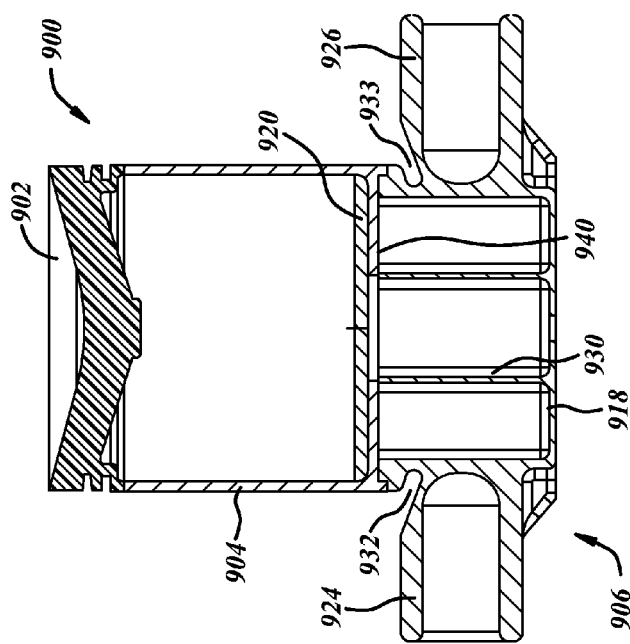

INTEGRATED PISTON AND BRIDGE

FIELD

The present disclosure relates to reciprocating pistons in internal combustion engines and the pistons' connections to connecting rods.

BACKGROUND

Outer pistons in an opposed-piston engine, such as is shown in U.S. Pat. No. 6,170,443, are less conventional than inner pistons. In particular, the piston is coupled to the crankshaft via two connecting rods. And, the connecting rods, also called pullrods, are almost always operating in tension. An outer piston arrangement that is lightweight so as to reduce reciprocating mass is desired.

SUMMARY

A lightweight piston system is disclosed that has a crown and a substantially-cylindrical skirt affixed to the crown at a first end of the cylindrical skirt, and a bridge structure coupled to a second end of the skirt. The bridge structure includes: a central support structure, a first projection extending outwardly from the central support structure in a first radial direction, and a second projection extending outwardly from the central support structure in a second radial direction. The first and second directions are substantially diametrically opposed.

In one embodiment, the first projection has first and second bearing surfaces that are substantially flat and substantially parallel to a central axis of the skirt; the second projection has third and fourth bearing surfaces that are substantially flat and substantially parallel to the central axis of the skirt; the first projection has a cylindrical portion with an outside surface of the cylindrical portion forming a bearing race; the second projection has a cylindrical portion with an outside surface of the cylindrical portion forming a bearing race; the cylindrical portion of the first projection is adjacent to the first and second bearing surfaces; a central axis of the cylindrical portion of the first projection is substantially perpendicular to the central axis of the skirt; the cylindrical portion of the second projection is adjacent to the third and fourth bearing surfaces; and a central axis of the cylindrical portion of the second projection is substantially perpendicular to the central axis of the skirt.

In an alternative embodiment, the first projection has a first portion that includes part of a rocking surface; the second projection has a second portion that includes part of a rocking surface; the rocking surface of the first projection is adjacent to the first and second bearing surfaces; and the rocking surface of the second projection is adjacent to the third and fourth bearing surfaces.

The central support structure has a substantially hollow 3-dimensional prism that includes outer walls substantially parallel to walls of the skirt, a first surface coupled at a first end of the outer walls of the disk, and a second surface coupled to a second end of the outer walls of the disk. The central support structure also has a plurality of internal braces extending between the first and second surfaces.

The outer walls of the disk form an octagon in one embodiment, alternatively any polygon.

The outer walls of the disk, the first surface, the first projection, and the second projection are integrally formed and the second surface is affixed to the outer walls of the disk and the braces by one of welding and gluing.

Outer edges of the second surface align with outer walls of the disk and outer edges of the first surface substantially align with an inner surface of the skirt.

The piston crown is formed separately from the skirt. The piston crown and the skirt are welded together.

In some embodiments, a groove is cut in the outer walls of the disk proximate the first projection and the second projection to relieve stresses.

The piston crown includes: at least two grooves in an outer surface adapted to accommodate piston rings; an upper surface adapted to form a portion of a combustion chamber; and an underside that includes a rib structure.

In some embodiments, a threaded aperture is defined in the piston crown wherein the threaded aperture is located substantially along a central axis of the skirt and is adapted for installation of a spark plug; a first aperture is defined in the first surface of the central support structure to provide access for electrical conductor associated with a spark plug to access the piston crown; and a second aperture is defined in the second surface of the central support structure to provide access for the electrical conductors to access the piston crown.

The skirt is mildly barrel shaped with the diameter of the skirt greatest at approximately a midpoint between the crown and the bridge structure.

The bridge structure, the piston skirt and the piston crown define an oil shaker. The piston system further includes an oil supply tube coupled to the bridge structure that passes through the bridge structure and is fluidly coupled to the oil shaker and an oil drain tube coupled to the bridge structure that passes through the bridge structure and is fluidly coupled to the oil shaker. An outlet end of the oil supply tube extends beyond the bridge structure and an inlet end of the oil drain tube is substantially coincident with the bridge structure.

An opposed-piston engine is disclosed that includes a block; a cylinder defined in the block; a crankshaft disposed within and supported by the block, the crankshaft having at least first and second eccentric journals; a first piston disposed in the cylinder; a second piston disposed in the cylinder; a first pullrod coupled to the first eccentric journal on a first end of the first pullrod; and a second pullrod coupled to the second eccentric journal on a first end of the second pullrod. The first piston includes: a crown; a substantially cylindrical skirt affixed to the crown at a first end of the skirt; and a bridge structure affixed to a second end of the skirt. The bridge structure includes a central support structure having an effective diameter roughly equal to a diameter of the skirt, a first projection extending outwardly from the central support structure in a first radial direction, and a second projection extending outwardly from the central support structure in a second radial direction.

In some embodiments, the cylinder wall has a first slot defined in the cylinder with the first projection extending through the first slot; and a second slot defined in the cylinder with the second projection extending through the second slot. The first and second slots are substantially parallel to a central axis of the cylinder.

The block includes first, second, third, and fourth linear bearings coupled thereto. The first, second, third, and fourth flat bearings associated with the projections adapted to ride on the first, second, third, and fourth linear bearings, respectively. In an alternative embodiment: the first projection has a first linearly-guided bearing; the second projection has a second linearly-guided bearing; the first projection engages with a second end of the first pullrod; and the second projection engages with a second end of the second pullrod. A first slot is defined in the cylinder with the first projection extending through the first slot. A second slot is defined in the cylinder with the second projection extending through the second slot. The first and second slots are parallel to a central axis of the cylinder. First and second linear bearings are coupled to the cylinder at the first slot with the first linearly-guided bearing of the first projection riding in the first slot on at least one of the first and second linear bearings. Third and fourth linear bearings coupled to the cylinder at the second slot with the second linearly-guided bearing of the second projection riding in the second slot on at least one of the third and fourth linear bearings.

The central support structure is a substantially hollow 3-dimensional polygon including: outer walls substantially parallel to walls of the skirt; a first surface coupled at a first end of the outer walls of the disk; and a second surface coupled to a second end of the outer walls of the disk; and a plurality of internal braces extending between the first and second surfaces. In one embodiment, the outer walls of the 3-dimensional polygon form an octagon. Alternatively, the outer walls can substantially form a polygon or a circle (polygon with an infinite number of sides).

The outer walls of the 3-dimensional polygon, the first surface, the second surface, the first projection, and the second projection are integrally formed and the second surface is affixed to the outer walls of the disk and the braces by one of welding and gluing.

In one embodiment, the enclosure is a substantially-hollow right prism. In some embodiments, the central support structure further includes: a circular plate and a plurality of external braces between the circular plate and an outside surface of the enclosure. The circular plate, the enclosure, the projections and the braces are integrally formed.

The piston further includes a circular plate affixed to a second end of the piston. The circular plate associated with the piston couples to the circular plate associated with the central support structure via bolts, pins, rivets, welds, or any suitable coupling technique. The circular plate affixed to the second end of the piston may be integrally formed with the skirt of the piston. Alternatively, the circular plate is affixed to the piston by welding or other suitable fabrication technique.

The skirt is slightly barrel shaped with the diameter of the skirt greatest at approximately a midpoint between the crown and the bridge.

The bridge structure, the piston skirt and the piston crown define an oil shaker cavity. The piston system also includes an oil supply tube coupled to the bridge structure that passes through the bridge structure and is fluidly coupled to the oil shaker cavity; and an oil drain tube coupled to the bridge structure that passes through the bridge structure and is fluidly coupled to the oil shaker cavity.

Some embodiments further include: first and second caps attached to the first and second projections where the projections are cutback radially. The bridge structure is made of a first material; the caps are made of a second material; and an outside surface of the caps form a bearing race.

In some embodiments, an outlet end of the oil supply tube extends beyond the bridge structure and an inlet end of the oil drain tube is substantially coincident with the bridge structure.

A method to assemble a piston is disclosed and includes: welding a piston crown to a first end of a piston skirt; forming a bridge structure by one of casting and forging; welding a cover onto an open end of the bridge structure; and attaching the bridge structure onto a second end of the piston skirt. The bridge structure may be attached by: welding, brazing, soldering, gluing, press fitting, bolting, or any suitable attachment scheme. The bridge structure includes first and second projections that extend outwardly in a substantially radial direction. The method also includes machining the piston skirt so that the piston skirt attains a barrel-shaped profile; machining a groove in the bridge structure proximate the first and second projections; grinding flat surfaces on a portion of the projection proximate the bridge structure. In one embodiment, the method includes forming a cylindrical bearing race on the ends of the first and second projections. Alternatively, the method includes forming a rocking surface on the ends of the first and second projections. In embodiments in which a cap is provided on the ends of the projections, the method includes affixing caps on ends of projections of the bridge structure by: welding, press fitting, brazing, bolting, pinning, or gluing.

An advantage according to an embodiment of the disclosure is that heat transfer is enhanced in the relatively large oil shaker cavity partially due to the oil hitting the bridge surface which is relatively cool compared to the piston crown.

BRIEF DESCRIPTION OF THE DRAWINGS

FIGS. 2 and 4 are cross-sectional representations of a piston assembly according to an embodiment of the disclosure;

FIGS. 3 and 5 are end views of the piston assembly represented in FIGS. 2 and 4;

FIG. 6 is an isometric view of a piston-and-bridge assembly according to an embodiment of the disclosure;

FIG. 13 is a cross-sectional representation of the piston of FIG. 12;

FIG. 14 is an exploded view of the piston of FIG. 12; and

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
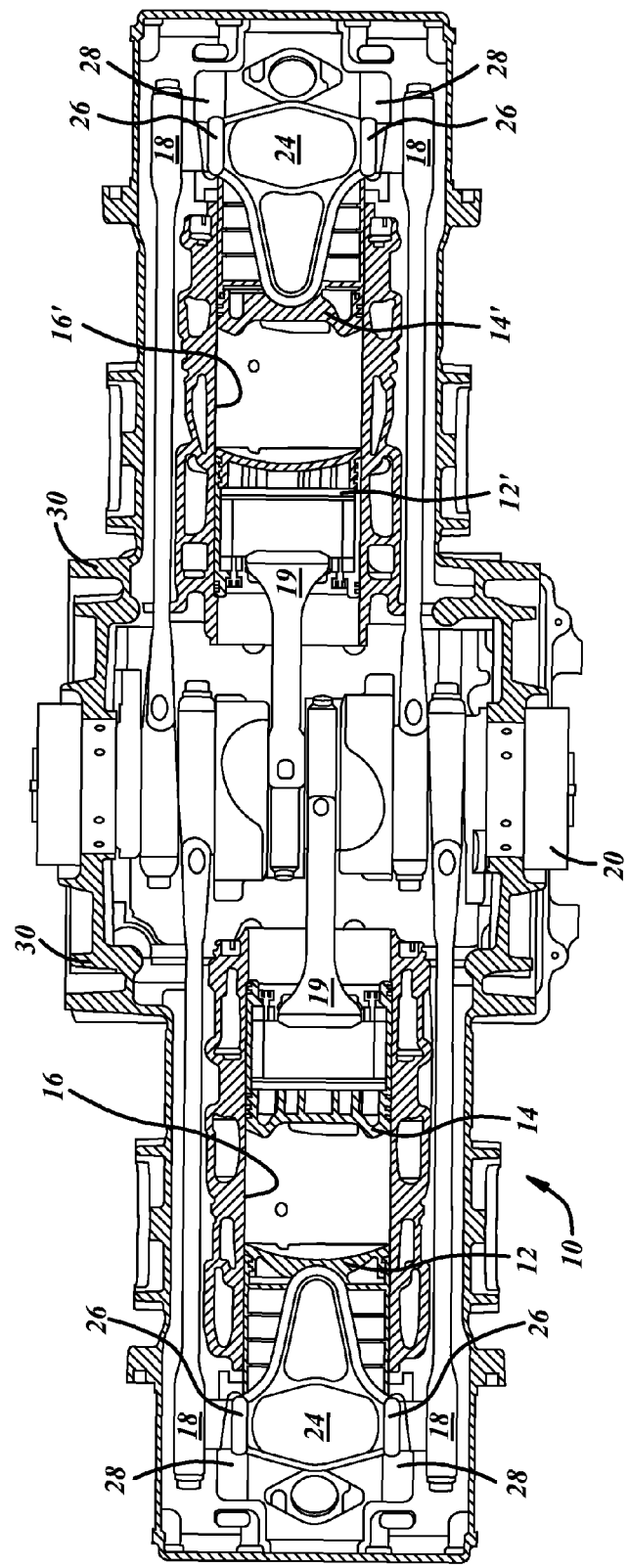
FIG. 1 is a cross-sectional representation of an opposed-piston, opposed-cylinder (OPOC) engine.

A cross section of an opposed-piston, opposed-cylinder (OPOC) engine 10, is shown in cross section in FIG. 1. An intake piston 12 and an exhaust piston 14 reciprocate within a left cylinder 16 and an intake piston 12' and an exhaust piston 14' reciprocate within cylinder 16'. Inner pistons couple to a journal on the crankshaft 20 via pushrods 19. Outer pistons: intake piston 12 and exhaust piston 14' couple to two journals (not visible in FIG. 1) of crankshaft 20 via a pair of pullrods 18 each and a guided bridge 24. A tip of guided bridge 24 nests with an underside of the outer pistons 12 and 14'. Projections extend outwardly from guided bridge 24 onto which flat bearing surfaces 26 are machined. Bearing surfaces 26 ride upon linear bearings 28 that are affixed to block 30. At each end of guided bridge 24 are provided a pair of flat bearing surfaces 28 with only one of them visible in FIG. 1. Also, there is a corresponding pair of linear bearings 28, but only a portion of the lower bearing is visible due to the view being a cross section. Guided bridge 24 is described in commonly-assigned patent publication US 2010-0229836 A1 and is incorporated herein in its entirety. Outward of bearing surfaces 26 is a cylindrical surface that forms a bearing race (not visible in FIG. 1) and has a sleeve bearing or a set of roller bearings that are provided between the bearing race and pullrod 18. A slot is provided in the cylinder liner through which the projections extend outwardly. The cross section of FIG. 1 passes through the slots and the linear bearing 28 are affixed on the slot surfaces.

Guided bridge 26 has a central portion extending into the piston that can make evenly cooling the underside of the piston more difficult. For some applications, it is desirable to provide an alternative arrangement to cool the piston. Also, it is desirable to have a piston that fits in the same space that of outer pistons 12 and 14' so that either arrangement can be used in the same cylinder block.

An alternate piston assembly 50 is shown in cross section in FIG. 2. Piston assembly 50 includes a crown 52 into which two piston ring grooves 56 and 58 are machined. A combustion bowl 54 is formed in the upper face of crown 52.

A piston skirt 70 is welded to crown 52 at weld joint 72. Piston skirt 70 may be formed from a cylindrical tube having a central axis 74. Piston skirt 70 is machined so that the diameter proximate locations 72 and 76 are slightly smaller than at location 78 on skirt 70. The shaping is modest such that it is not easily recognized in FIG. 2.

A substantially-hollow bridge 80 having a cover 82 over an open end of bridge 80 is coupled to skirt 70 at a weld 84. A shoulder is formed in bridge 80 near the weld between bridge 80 and skirt 70. A surface 86 of bridge 80 has a circular outer edge to mate with the inner edge of skirt 70. A stress relieving groove 88 is formed in bridge 80 in the region near projections 90 and 92. A first projection 90 and a second projection 92 extend outwardly from bridge 80. Projections 90 and 92 are substantially diametrically opposed from each other. At the ends 94 and 96 of the projections 90 and 92, respectively, are cylindrically shaped (with a central axis 98 of ends 94 and 96 perpendicular to central axis 74). Bridge 80 is substantially hollow but has a plurality of braces 100 that extend between the main body of bridge 80 and cover 82. Cover 82 is laser welded to the main body of bridge 80 at the outer edge and where braces 100 are proximate cover 82. Cover 82 provides stability to braces 100.

An end view of piston 50 is shown in FIG. 3. Braces 100 are arranged in a square grid pattern. However, this is just one nonlimiting example of suitable bracing arrangements.

Cover 82 is shaped as an octagon. A main portion of bridge 80, i.e., away from surface 86, is also shaped as a 3-dimensional octagon. In other embodiments, the main body may be round or any polygonal shape, generically called a 3-dimensional disk herein.

Projections 90 and 92 extend through slots formed in the cylinder liner of the bore (not shown in FIG. 3). Flats 110 and 112 are formed on projections 90 and 92, respectively. Flats 110 and 112 ride on linear bearings in the block (not shown) during reciprocation of piston 50.

A cross section of piston 50 is shown in FIG. 4. The cross section in FIG. 4 is taken 90 degrees rotated with respect to the cross section in FIG. 2. Thus, the projections extending from bridge 80 are not visible in FIG. 4.

An oil shaker cavity 114 is formed by crown 52, skirt 70, and bridge 80. An oil supply tube 116 to welded to cover 82 at end 120. An outlet end 118 of tube 116 extends beyond surface 86 through an aperture 122 in surface 86 of bridge 80 to avoid oil that pools on surface 86 from draining into tube 116 and interfering with the delivery of oil through oil supply tube 116. An oil drain tube 124 is welded to cover 82 at outlet end 126 of tube 124. Tube 124 is fit through an aperture 128 in surface 86 of bridge 80.

A view from the top of crown 50 is shown in FIG. 5. Crown 50 has a lattice 130 in the underside. Lattice 130 (shown in phantom in FIG. 5) allows the top of the crown to be thinner than it would otherwise be due to the strengthening that lattice 130 provides. Furthermore, lattice 130 acts as a fin to remove heat from crown 50.

An isometric view of piston assembly 50 is shown in FIG. 6. The bridge has an upper surface 86, with only a portion of it visible between corners of a central support structure 150, also referred to herein as a 3-dimensional disk. In FIG. 6, the 3-dimensional disk is a 3-dimensional octagon. Bridge 80 has projections 90 and 92 extending outwardly and flats 112.

Figure 7:
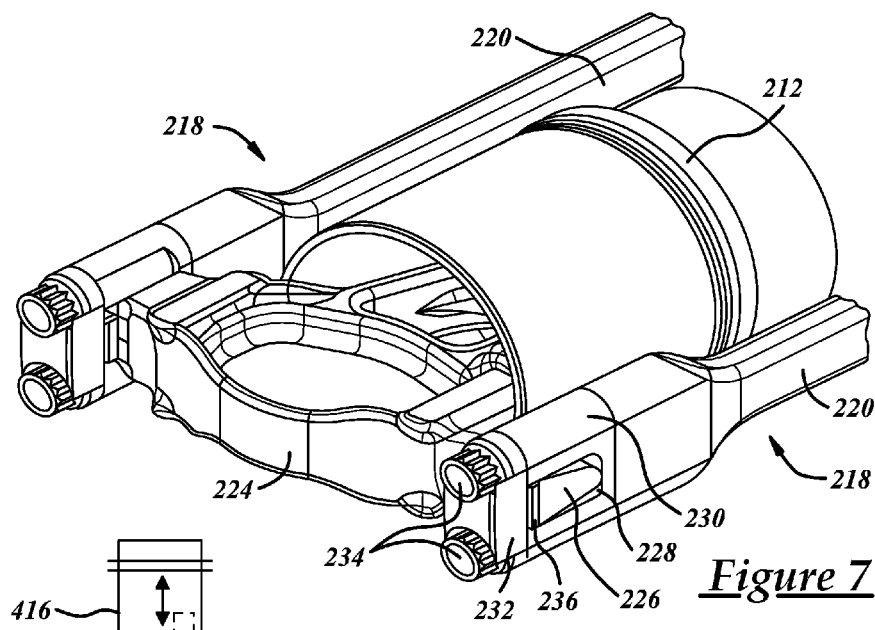
FIG. 7 is an illustration of a rocking joint.

The bridges described in relation to FIGS. 1-6 show a cylindrical bearing race on the projections that extend from the bridge. In one alternative, a rocking surface is provided on the projections that extend from the bridge, such as described in commonly-assigned patent publication US 2012-0073538 A1 which is incorporated herein in its entirety. Such a rocking joint is illustrated in FIG. 7. An outer piston 212 is coupled to pullrods 218 via a bridge 224. Pullrods 218 include: a pullrod main body 220, a center element 230, a bearing element 236, and an end cap 232, all held together via bolts 234. Bridge 224 has cross-projection extensions 226 extending outwardly toward pullrods 218. Cross-projection extensions 226 extend into opening 228. Cross-projection extensions 226 have a rocking surface that rocks on bearing element 236.

Figure 8:
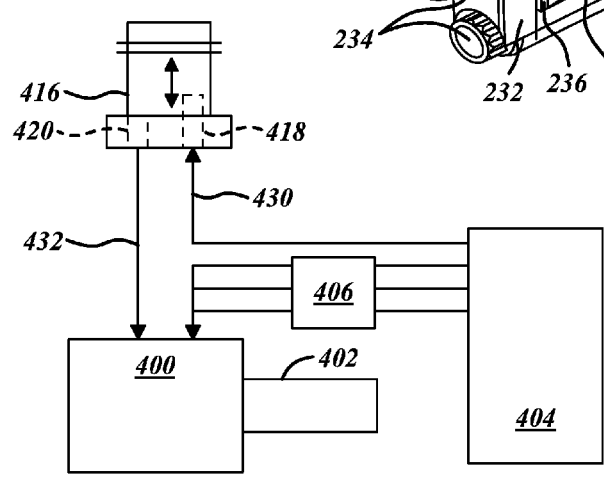
FIG. 8 is a block diagram of an engine lubrication circuit.

In FIG. 8, a block diagram of a lubrication circuit is shown in which oil is collected in an oil sump 400. An oil pump 402 obtains oil from sump 400 and provides pressurized oil to the engine. Within the engine is an oil manifold 404, which means that pressurized oil is directed to many elements 406 within the engine to lubricate and/or cool the elements 406, e.g., oil is provided to bearings, as one nonlimiting example. According to an embodiment of the present disclosure, pressurized oil is provided to a piston 416 through a delivery tube 430. During operation, piston 416 reciprocates as shown by the double headed arrow. Piston 416 has an oil supply tube 418 that engages with delivery tube 430. That is, piston 416 is shown at an upper position in FIG. 8. When piston 416 moves downward, the oil supply tube 418 moves over delivery tube 430. Oil from elements 406 and from piston 416 drain into sump 400 via gravity. Oil from piston 416 drains through drain tube 420. A heat exchanger or radiator to cool the oil is commonly provided, but not shown in FIG. 8.

Figure 9:
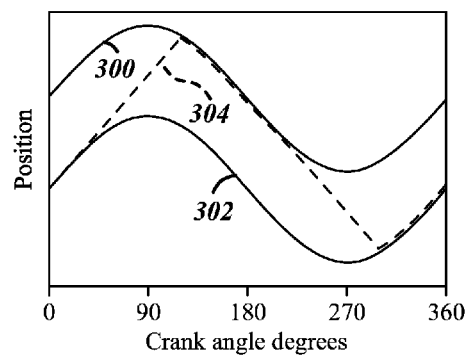
FIG. 9 is a plot of piston position as a function of crank angle degree and position of oil within the oil shaker cavity inside the piston.

Piston position is plotted as a function of crank angle degree for one revolution of the engine in FIG. 9. Position of the underside of the piston crown is shown as curve 300. Position of the surface associated with the bridge (element 86 in FIGS. 2 and 4) is plotted as curve 302. The two reciprocate together, but offset by the interior height of oil shaker cavity 114. Position of the oil is plotted as dashed line 304. At 0 degrees, the piston is moving upward and the oil is on the bridge surface. At about 30 degrees, the piston begins to decelerate as it starts to approach top dead center at 90 degrees. As the piston starts to decelerate, the oil has nothing to hold it against the bridge surface. The oil continues to move upward at about a constant velocity from 30 degrees until 120 degrees crank angle when it impacts the crown surface. The oil remains on the crown surface at the piston moves downwardly until the piston starts to decelerate as it approaches the bottom dead center position at 270 crank angle degrees. The oil separates from the crown surface at about 210 crank angle degrees and travels downwardly until it impacts the bridge surface at about 300 crank angle degrees where it stays on the bridge surface for the remainder of the revolution.

FIG. 9 applies to all engine speeds. That is, the oil impacts the surfaces at the same crank angle degree regardless of engine speed. However, the oil velocity moving between the two surfaces is affected by engine speed. To affect the crank angle of impact, the distance between the bridge and crown surfaces should be altered. The impaction of the oil onto the crown may cause particularly effective heat transfer.

Oil is continuously being injected into through the oil supply tube into the oil shaker cavity. Oil drains out through oil drain tube. A steady-state volume of oil develops depending on viscosity of the oil and other factors.

Figure 10:
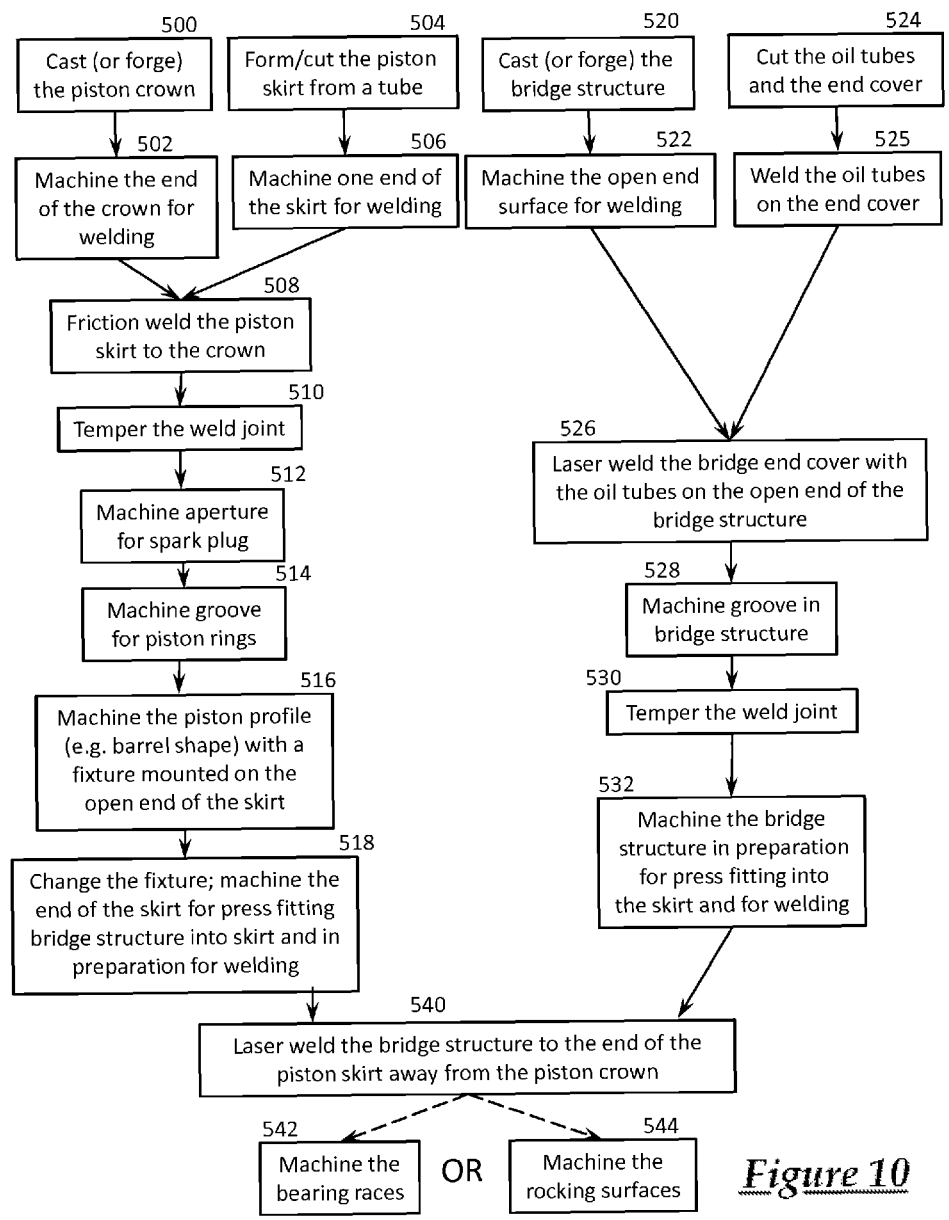
FIGS. 10 and 15 are flowcharts indicating processes to fabricate pistons according to embodiments of the present disclosure.

One embodiment of machining processes used to produce a piston according to the disclosure is shown in FIG. 10. The piston crown is cast or forged in block 500. In block 502, the open end of the piston crown is machined in preparation for welding. In block 504, the piston skirt is formed or cut from a tube of material. In block 506, one end of the piston skirt is machined in preparation for welding. In block 508, the end of the piston skirt and the end of the piston crown that have been prepared for welding are friction welded. Alternatively, they could be welded using other techniques. In block 510, the weld joint is tempered. In block 512, an aperture for the spark plug, if it is an embodiment with a spark plug, is machined into the crown. Grooves for piston rings are machined in the piston crown in block 514. In block 516, the piston profile is machined, i.e., into the barrel shape in which the end near the crown and the end away from the crown have a diameter less than the diameter at the midway point between the two ends. In the machining process to provide the desired piston profile, any extra material left on the outer surface from the weld in step 508 is also removed. To support the open end of the piston skirt, a fixture is mounted during the piston profile machining. Afterward, the fixture is replaced with a different fixture that facilitates preparing the end for welding, which includes putting in a small step in which the bridge structure is to be press fit, in block 518.

In block 520, the bridge structure is cast or, in an alternative embodiment, forged. The open end of the bridge structure is machined in preparation for welding in block 522. The end cover for the bridge structure is formed or cut in block 524. Also, in block 524, oil tubes are cut. In block 525 oil tubes are welded to the end cover. These oil tubes provide lubricant access to the underside of the piston with pressurized oil directed into one of the tubes and oil draining out of the other of the tubes. In block 526, the end cover is laser welded onto the open end of the bridge structure. In block 528 a groove is machined in the bridge structure. In block 530, the weld joint is tempered. In block 532, the end of the bridge that is to be mounted to the skirt is machined in preparation for welding. In block 540, the bridge structure is laser welded to the piston skirt on an end of the piston skirt that is away from the piston crown. In block 542, the bearing races are machined on the projections of the bridge structure. Or, in an alternative embodiment, rocking surfaces are machined on the projections of the bridge structure in block 544.

Figure 11:
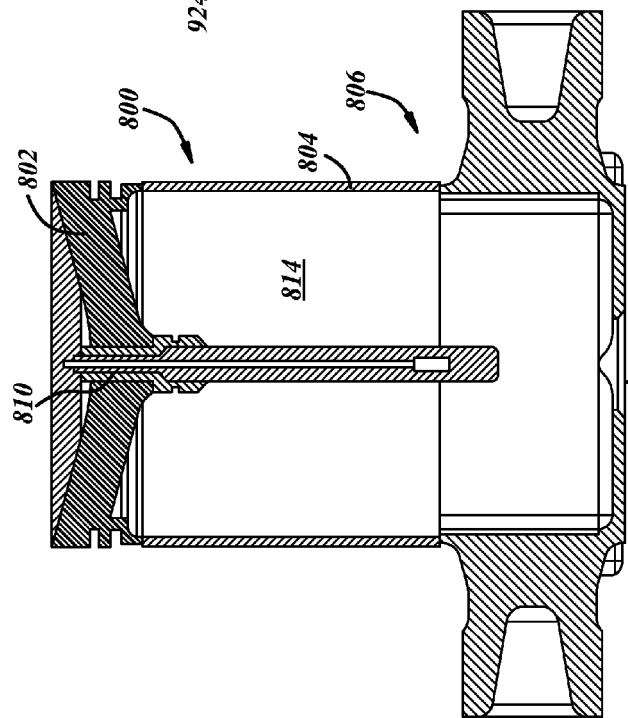
FIG. 11 is a piston having a centrally located spark plug provided in the piston crown.

For opposed-piston engine that are spark ignited, the spark plug may either protrude into the cylinder through a cylinder or through the piston top. Such a piston 800 is shown in FIG. 11. Piston 800 has a crown 802, a skirt 804 and a bridge 806. A spark plug 810 is installed centrally in piston crown 802. Conductors to spark plug 810 exit through an opening 812 in the bottom of the bridge 806. Also shown in FIG. 11 is oil supply tube 808. Piston 800 is different than pistons shown in other Figures as the oil shaker cavity 814 is much shorter. Thus, oil supply tube 808 is longer than shown in other embodiments so that it accesses the oil shaker cavity 814 that is displaced closer to piston crown 802.

Figure 12:
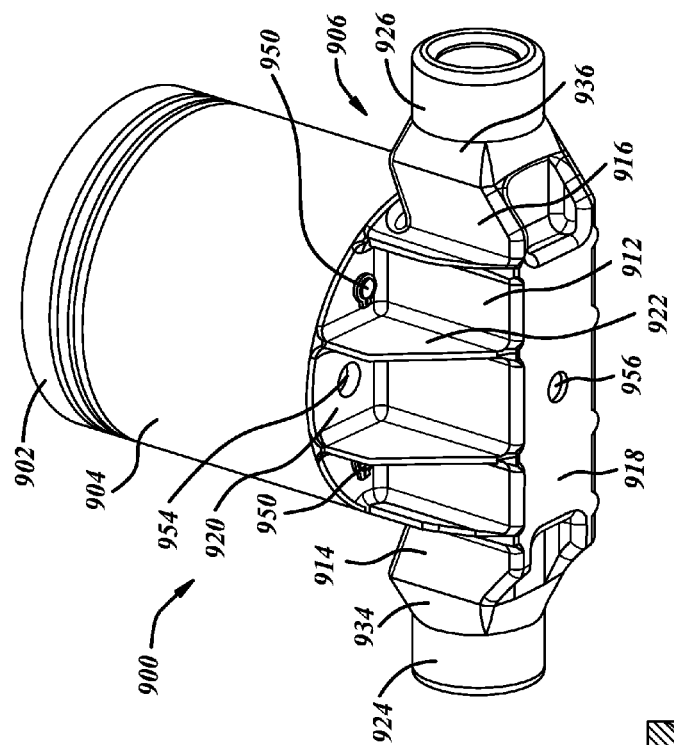
FIG. 12 is an isometric view of a piston-and-bridge assembly according to an embodiment of the disclosure.

In FIG. 12, an isometric view of a piston assembly 900 is shown. A piston crown 902 having grooves for compression rings is welded to a piston skirt 904. A bridge 906 is affixed to an end of skirt 904 away from crown 902. Bridge 906 includes, a central support structure 912, a first projection 914 that extends outwardly from central support structure 912, and a second projection 916 that extends outwardly from central support structure 912. Central support structure 912 includes an enclosure 918, which in this case is substantially a cuboid. Central support structure also includes a circular plate 920 and external ribs 922. In the embodiment in FIG. 12, projections 914 and 916 have cylindrical bearing races 924 and 926, respectively, that couple to pullrods with roller bearing between. The end of projections 914 and 916 could alternatively have a rocking surface, such as cross-pin extensions 226 in FIG. 7 that mate with a rocking surface on the pullrods. Projection 914 also includes a bearing surface 934 and projection 916 has a bearing surface 936. Each of projections 914 and 916 includes a second bearing surface which is not visible. The bearing surfaces ride on bearing materials (28 in FIG. 1) that are provided in slots in the cylinder wall (16, 16' in FIG. 1) during reciprocation. Dowel pin 950 couple bridge 906 with piston skirt 904. A clip is placed in a groove in dowel 950.

In FIG. 13, a cross section of piston assembly 900 is shown. Enclosure 918 includes internal braces or ribs 938. Circular plate 920 couples to a circular plate 940 that is coupled to the open end of skirt 904. In one embodiment, skirt 904 is integrally formed with circular plate 940. Alternatively, skirt 904 is formed separately and circular plate 940 is attached via welding or other coupling technique. Grooves 932 and 933 are formed in enclosure 918 between skirt 904 and projections 914 and 916, respectively. Grooves 932 and 933 provide stress relief to allow bridge 906 flex with respect to the piston (skirt 904 and crown 902) without cracking or breaking.

Bridge 906 is coupled to the piston by coupling plate 920 to plate 940 in at least three locations. Referring back to FIG. 12, two fasteners 950 are visible. Piston crown 902 likely has a groove through which a fuel jet from a side mounted injector travels. The groove should be aligned to the position in the cylinder in which the injector I mounted. Likewise, the indexing of the bridge is fixed to one position because projections 914 and 916 have surfaces that engage with surfaces on the cylinder, e.g, the slots on which the linear bearings are applied. For this reason, it is unlikely that it is possible to friction weld the circular plate of the bridge to the piston skirt as obtaining a desired relative position of the two parts is not probable with friction welding, i.e., leading to the fasteners that allow the two to be indexed as desired. Fasteners 950 may be rivets, bolts with nuts, pins with grooves to accommodate clips, or any suitable fasteners.

Cooling supply and return tubes are not shown in FIGS. 12 and 13. However, these may be provided as shown in prior Figures. Orifices 954 and 956 are provided to accommodate the coolant tubes.

In FIG. 14, an exploded view of piston 900 is shown. Piston crown couples with piston skirt 904 that couples with bridge 906. Skirt 904 has a circular plate 920 that includes orifices 958 for coupling the bridge via dowels and clips or studs and nuts. Bridge 906 includes orifices 954 and 956 to accommodate cooling tubes. Bridge 906 also includes at least three orifices 960 through circular plate 940 through which dowels 950 are inserted. Dowels 950 couple to plate 920 via welding, brazing, press fitting, or any suitable coupling technique. Snap rings 952 are fit into a groove in dowels 950 to hold the assembly together.

A right prism is a prism in which the side faces and the edges joining side faces are perpendicular to the base faces. A right prism has polygon ends and rectangular sides. In the embodiment in FIG. 14, the central support structure is a cuboid, i.e., a rectangular box. If the polygon of the right prism is a regular polygon, i.e., with all sides equal and the number of sides approaching infinity, the prism approaches a cylinder. In other alternatives, the central support structure may be any prismatoid. In the embodiments described herein, the enclosure of the central support structure is substantially hollow for weight reduction purpose. Most embodiments do, however, include internals ribs. Also, although the shape is described as prismatoid, it is understood by one skilled in the art that the actual shape may deviate slightly from the prismatoid shape, e.g., rounded edges.

Figure 15:
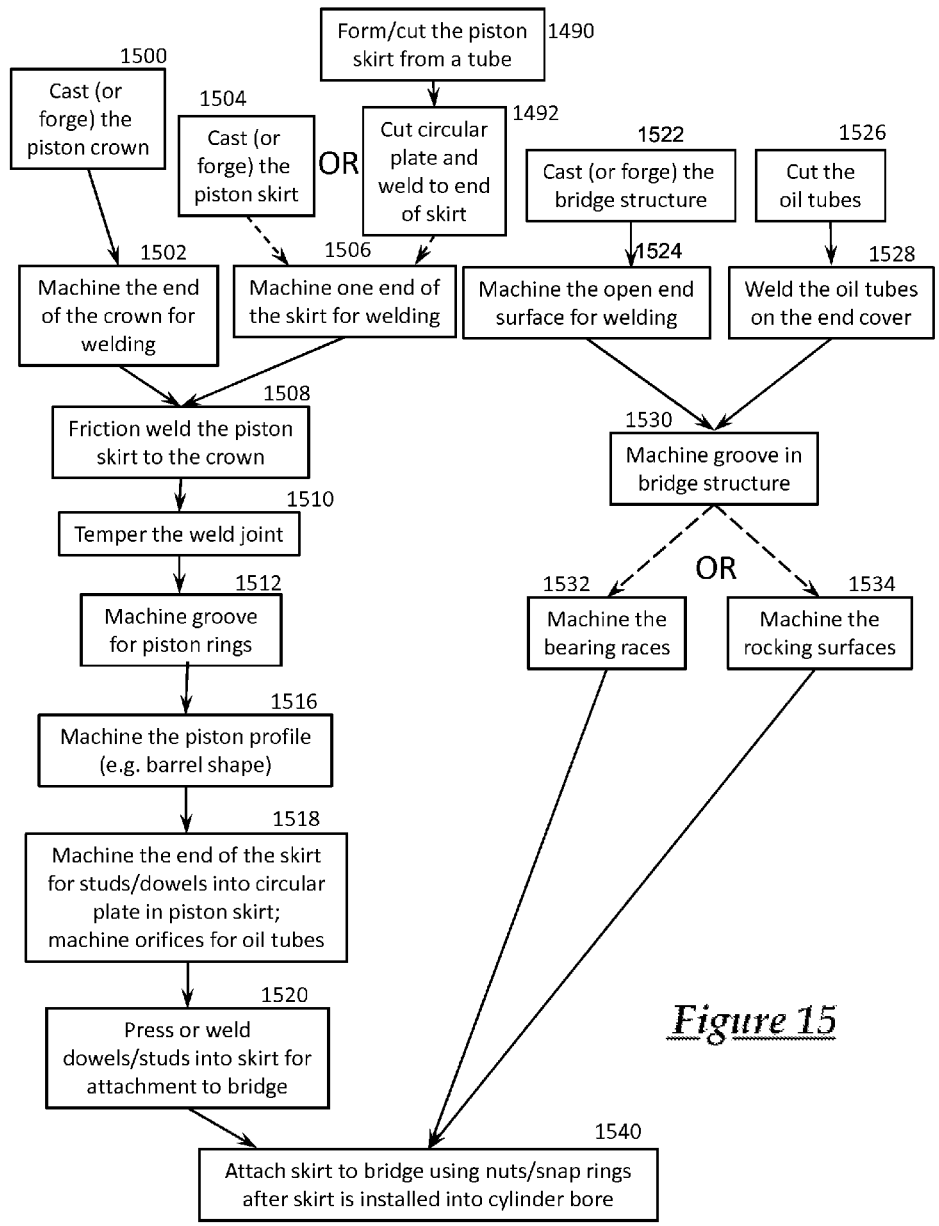
Figure 17:
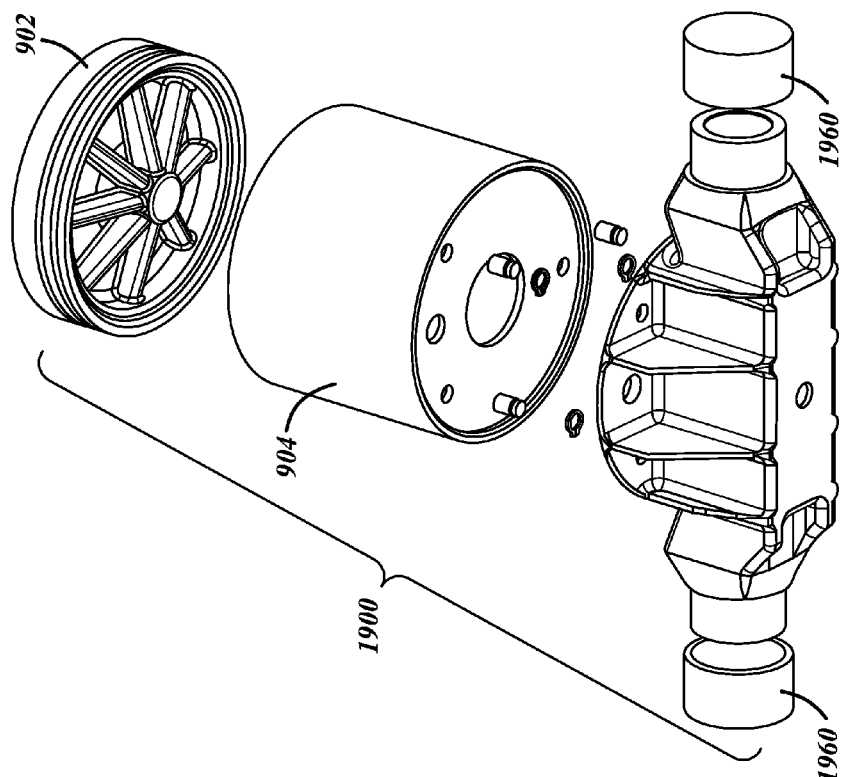
FIG. 17 is an exploded view of the piston of FIG. 16.

An alternative embodiment of machining processes used to produce a piston according to the disclosure is shown in FIG. 15. The piston crown is cast or forged in block 1500. In block 1502, the open end of the piston crown is machined in preparation for welding (block 1524). There are two alternatives to preparing a piston skirt. In one alternative in block 1504, the piston skirt is cast or forged. In the embodiment in FIG. 15, the piston skirt has a circular plate at the end away from the piston crown. In block 1504, the piston skirt is integrally formed with the plate. In the alternative in block 1490, the piston skirt is cut from a tube and the circular plate is affixed to the piston skirt in block 1492. From either of blocks 1504 or 1492, one end of the piston skirt is next machined in preparation for welding 1506. In block 1508, the end of the piston skirt and the end of the piston crown that have been prepared for welding are friction welded. Alternatively, they could be welded using other techniques. In block 1510, the weld joint is tempered. In block 1512, an aperture for the spark plug, in embodiments including a spark plug, is machined into the crown. Also, grooves for piston rings are machined in the piston crown. In block 1516, the piston profile is machined, i.e., into the barrel shape in which the end near the crown and the end away from the crown have a diameter less than the diameter at the midway point between the two ends. In the machining process to provide the desired piston profile, any extra material left on the outer surface from the weld in block 1508 is also removed. In block 1518, the circular plate is machined to accept studs or dowels that are to be used for attaching the bridge to the piston and machined to accommodate the oil tubes. In block 1520, the dowels or studs are pressed into the circular plate at the bottom of the piston skirt.

In block 1522, the bridge structure is cast or, in an alternative embodiment, forged. The open end of the bridge structure is machined in preparation for welding. In block 1526 oil tubes are cut and in block 1528 the oil tubes are welded to the bridge. These oil tubes provide lubricant access to the underside of the piston with pressurized oil directed into one of the tubes and oil draining out of the other of the tubes. In block 1530, grooves are machined into the bridge structure (i.e., grooves 932 in FIG. 13).

Blocks 1532 and 1534 show two embodiments. In block 1532, bearing races are machined on the projections of the bridge structure. Or, in an alternative embodiment, rocking surfaces are machined on the projections of the bridge structure in block 1534. In block 1540, the bridge structure is coupled to the piston using nuts (in the alternative in which the studs are threaded) and using snap rings (in the alternative in which dowels are used and the dowels have a groove into which the snap rings fit).

Figure 16:
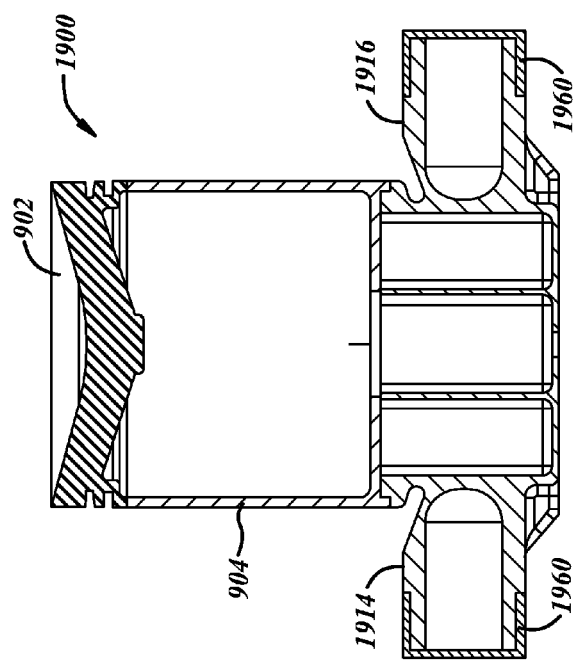
FIG. 16 is a cross-sectional view of a piston-and-bridge assembly according to an embodiment of the disclosure.

An alternative embodiment of the piston-bridge assembly 1900 is shown in cross section in FIG. 16. Crown 902 and skirt 904 are the same as those shown in FIGS. 12-14. Bridge 1906 has projections 1914, 1916 extending radially outwardly. Projections 1914, 1916 are cut back at the ends to accommodate caps 1960 that form the bearing race surfaces. Caps 1960 may be press fit onto projections 1914, 1916 or attached in any suitable manner. An advantage of such an approach is that bridge 1906 may be made of aluminum or other lightweight material. Caps 1960 may be formed of a high-strength steel, titanium, or other material suitable to serve as a bearing race. By doing so, the cost of an exotic material such as titanium and/or the weight of a material such as steel is largely avoided by making the majority of the bridge out of the lighter, low-cost material. For some applications, a bridge made completely of titanium, magnesium, or other exotic material is desired, e.g., when very light piston-bridge assembly weight is important. In other applications, the bridge is completely formed of steel, or other conventional material. And, yet in other embodiments, bridge 1906 is made of one material and cap 1960 is made of another material.

While the best mode has been described in detail with respect to particular embodiments, those familiar with the art will recognize various alternative-designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An opposed-piston engine, comprising:
   a block;
   a cylinder defined in the block;
   a crankshaft disposed within and supported by the block, the crankshaft having at least first and second eccentric journals;
   a first piston disposed in the cylinder;
   a second piston disposed in the cylinder;
   a first pullrod coupled to the first eccentric journal on a first end of the first pullrod; and
   a second pullrod coupled to the second eccentric journal on a first end of the second pullrod wherein the first piston includes:

a crown;
a substantially cylindrical skirt affixed to the crown at a first end of the skirt; and
a bridge structure affixed to a second end of the skirt, the bridge structure having:
   a substantially-hollow central support structure;
   a first projection extending radially outwardly from the central support structure,
   a second projection extending radially outwardly from the central support structure;
   a first groove in the central support structure proximate the first projection; and
   a second groove in the central support structure proximate the second projection.

2. The engine of claim 1 wherein:
the first projection has a first bearing surface;
the second projection has a second bearing surface;
the first projection engages with a second end of the first pullrod; and
the second projection engages with a second end of the second pullrod.

3. The engine of claim 2, further comprising:
first and second linear bearings coupled to the cylinder with the first bearing surface of the first projection riding on at least one of the first and second linear bearings; and
third and fourth linear bearings coupled to the cylinder with the second bearing surface of the second projection riding on at least one of the third and fourth linear bearings.

4. The engine of claim 1 wherein the central support structure comprises:
an upper first surface and a lower second surface; and
a plurality of internal braces extending between the first and second surfaces.

5. The engine of claim 1 wherein the bridge structure, the piston skirt and the piston crown define an oil shaker cavity, the engine further comprising:
an oil supply tube coupled to the bridge structure that passes through the bridge structure and is fluidly coupled to the oil shaker cavity; and
an oil drain tube coupled to the bridge structure that passes through the bridge structure and is fluidly coupled to the oil shaker cavity.

6. The engine of claim 1 wherein:
the first projection has a cylindrical portion;
the second projection has a cylindrical portion; and
the cylindrical portions of the first and second projections are substantially perpendicular to a central axis of the skirt.

7. The engine of claim 1 wherein the central support structure comprises:
a substantially hollow enclosure extending between the first projection and the second projection; and
at least one internal brace.

8. The engine of claim 1 wherein:
the piston crown is formed separately from the skirt;
the piston crown and the skirt are welded together; and
the piston crown includes:
   at least two grooves in an outer surface adapted to accommodate piston rings;
   an upper surface adapted to form a portion of a combustion chamber; and
   an underside that includes a rib structure.

9. The piston system of claim 1 wherein the first and second grooves are stress relieving grooves formed in the bridge structure proximate the first and second projections respectively.

10. An opposed-piston engine, comprising:
a block;
a cylinder defined in the block;
a crankshaft disposed within and supported by the block, the crankshaft having at least first and second eccentric journals;
a first piston disposed in the cylinder;
a second piston disposed in the cylinder;
a first pullrod coupled to the first eccentric journal on a first end of the first pullrod; and
a second pullrod coupled to the second eccentric journal on a first end of the second pullrod, wherein the first piston includes:
a crown;
a substantially cylindrical skirt affixed to the crown at a first end of the skirt; and
a bridge structure affixed to a second end of the skirt, the bridge structure having:
   a substantially-hollow central support structure;
   a first projection extending radially outwardly from the central support structure, and
   a second projection extending radially outwardly from the central support structure;
wherein an oil shaker is defined within the first piston, the engine further comprising:
an oil supply tube that: is coupled to the bridge structure, passes through the bridge structure, and is fluidly coupled to the oil shaker; and
an oil drain tube that: is coupled to the bridge structure, passes through the bridge structure and is fluidly coupled to the oil shaker.

11. The engine of claim 10 wherein an outlet end of the oil supply tube extends inwardly into the oil shaker beyond the bridge structure and an inlet end of the oil drain tube is substantially coincident with the bridge structure.

12. An opposed-piston engine, comprising:
a block;
a cylinder defined in the block;
a crankshaft disposed within and supported by the block, the crankshaft having at least first and second concentric journals;
a first piston disposed in the cylinder;
a second piston disposed in the cylinder;
a first pullrod coupled to the first eccentric journal on a first end of the first pullrod; and
a second pullrod coupled to the second eccentric journal on a first end of the second pullrod wherein the first piston includes:
a crown;
a substantially cylindrical skirt affixed to the crown at a first end of the skirt; and
a bridge structure affixed to a second end of the skirt, the bridge structure having:
a substantially-hollow central support structure;
wherein the bridge structure, the piston skirt and the piston crown define an oil shaker cavity, the engine further comprising:
an oil supply tube coupled to the bridge structure that passes through the bridge structure and is fluidly coupled to the oil shaker cavity; and
an oil drain tube coupled to the bridge structure that passes through the bridge structure and is fluidly coupled to the oil shaker cavity.

13. The engine of claim 12 wherein:
the bridge structure further comprises a first projection extending radially outwardly from the central support structure and a second projection extending radially outwardly from the central support structure;

a second end of the first pullrod couples with the first projection; and a second end of the second pullrod couples with the second projection.

14. The engine of claim 12 wherein the central support structure has an upper first surface, a lower second surface and a plurality of internal braces extending between the first and second surfaces.

15. The engine of claim 13 wherein the first projection has a first bearing surface and the second projection has a second bearing surface, the engine further comprising:

first and second linear bearings coupled to the cylinder with the first bearing surface of the first projection riding on at least one of the first and second linear bearings; and third and fourth linear bearings coupled to the cylinder with the second bearing surface of the second projection riding on at least one of the third and fourth linear bearings.

16. The engine of claim 12
wherein an outlet end of the oil supply tube extends inwardly into the oil shaker beyond the bridge structure and an inlet end of the oil drain tube is substantially coincident with the bridge structure.

17. The piston system of claim 12, further comprising:
grooves defined in the bridge structure proximate the first and second projections.

\* \* \* \* \*